(12) United States Patent
Mine et al.

(10) Patent No.: US 9,511,550 B2
(45) Date of Patent: Dec. 6, 2016

(54) MOLDING METHOD FOR FIBER REINFORCED COMPOSITE MATERIAL

(71) Applicant: Panasonic Corporation, Kadoma-shi, Osaka (JP)

(72) Inventors: Hideo Mine, Nara (JP); Takeshi Kiritoshi, Osaka (JP); Kazuyuki Harada, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 101 days.

(21) Appl. No.: 14/329,567

(22) Filed: Jul. 11, 2014

(65) Prior Publication Data

US 2015/0017390 A1   Jan. 15, 2015

(30) Foreign Application Priority Data

Jul. 12, 2013 (JP) ................................. 2013-146188

(51) Int. Cl.
*B29C 70/46* (2006.01)
*B29C 70/54* (2006.01)
(Continued)

(52) U.S. Cl.
CPC ........... *B29C 70/46* (2013.01); *B29C 35/0288* (2013.01); *B29C 37/0053* (2013.01);
(Continued)

(58) Field of Classification Search
CPC ... B29C 70/46; B29C 35/0288; B29C 37/0053
See application file for complete search history.

(56) References Cited

U.S. PATENT DOCUMENTS 3,883,632 A * 5/1975 Petrochko ................. B41C 3/06
                                                       264/293
4,014,970 A * 3/1977 Jahnle ..................... B29C 43/003
                                                       264/161
(Continued)

FOREIGN PATENT DOCUMENTS

CN       1842381 A    10/2006
CN     101909839 A    12/2010
(Continued)

OTHER PUBLICATIONS

Cantwell, W.J., The Influence of Stamping Temperature on the Properties of a Glass Mat Thermoplastic Composite, J. of Composite Materials, vol. 30, No. 11 (1996), pp. 1266-1281.*
(Continued)

*Primary Examiner* — Matthew Daniels
(74) *Attorney, Agent, or Firm* — Hamre, Schumann, Mueller & Larson, P.C.

(57) ABSTRACT

According to a molding method for a fiber reinforced composite material, a cavity forming surface 13 of a second mold 12 with a recessed portion 14 for molding a thick portion is brought into contact with a fiber reinforced composite material 15. The fiber reinforced composite material 15 is heated in a state in which the temperature of the cavity forming surface 13 is higher than that of a cavity forming surface 11 of a first mold 10. After that, the first mold 10 and the second mold 12 are closed with a pressure to the fiber reinforced composite material 15 so as to pass the fiber reinforced composite material 15 into the recessed portion 14. This can integrally mold the thick portion with the main body of a molded component.

4 Claims, 8 Drawing Sheets

(51) Int. Cl.
  *B29C 35/02* (2006.01)
  *B29C 59/02* (2006.01)
  *B29C 37/00* (2006.01)
  *B29C 43/20* (2006.01)
  B29C 35/04 (2006.01)
  B29C 43/02 (2006.01)

(52) U.S. Cl.
  CPC ......... *B29C 43/203* (2013.01); *B29C 59/026* (2013.01); *B29C 70/543* (2013.01); *B29C 35/0266* (2013.01); *B29C 35/04* (2013.01); *B29C 43/021* (2013.01); *Y10T 428/24479* (2015.01)

(56) References Cited

U.S. PATENT DOCUMENTS

| | | | | |
|---|---|---|---|---|
| 4,044,188 | A * | 8/1977 | Segal | B29C 70/025 156/244.25 |
| 4,543,288 | A * | 9/1985 | Radvan | B29C 70/12 428/297.4 |
| 4,784,814 | A * | 11/1988 | Diethelm | B29C 33/04 264/102 |
| 4,937,032 | A * | 6/1990 | Krone | B29C 70/08 156/242 |
| 4,950,532 | A * | 8/1990 | Das | B29C 35/02 264/257 |
| 4,964,935 | A * | 10/1990 | Biggs | B29C 43/003 156/242 |
| 5,783,132 | A * | 7/1998 | Matsumoto | B29C 70/46 156/222 |
| 5,885,504 | A * | 3/1999 | David | B29C 35/0288 264/257 |
| 6,478,922 | B1 * | 11/2002 | Rosevear | B29C 70/44 156/285 |
| 7,445,836 | B2 * | 11/2008 | Yamane | B29C 70/081 428/168 |
| 8,101,262 | B2 | 1/2012 | Yamanouchi et al. | |
| 2007/0018356 | A1 | 1/2007 | Nakamura et al. | |
| 2009/0115104 | A1 | 5/2009 | Anbarasu et al. | |
| 2012/0038081 | A1 | 2/2012 | Kendall | |

FOREIGN PATENT DOCUMENTS

| | | |
|---|---|---|
| EP | 0 459 321 A1 | 12/1991 |
| IE | 68438 | 6/1996 |
| JP | 63-87228 | 4/1988 |
| JP | 5-77253 A | 3/1993 |
| JP | 6-320655 | 11/1994 |
| JP | 2004-358828 | 12/2004 |
| JP | 2012-36295 A | 2/2012 |
| JP | 2012-506804 A | 3/2012 |

OTHER PUBLICATIONS

Office Action issued in corresponding Chinese Patent Application No. 201410235152.X on Feb. 29, 2016 and English translation of search report.
Notice of Allowance issued in corresponding Japanese Patent Application No. 2013-146188, Aug. 17, 2016.

* cited by examiner

MOLDING METHOD FOR FIBER REINFORCED COMPOSITE MATERIAL

FIELD OF THE INVENTION

The present invention relates to a molding method for a fiber reinforced composite material and a molding apparatus for the fiber reinforced composite material.

BACKGROUND OF THE INVENTION

Fiber reinforced composite materials containing reinforced fibers and a matrix resin have a high specific strength, a high specific modulus, excellent mechanical characteristics, and high performance characteristics such as weather resistance and chemical resistance, and thus such materials have received attention in the use of aircraft parts, automobile parts, construction materials, and sports goods and have been increasingly demanded with the years.

Prepregs for fiber reinforced composite materials are manufactured by, for example, impregnating reinforced fiber tow or cloth with an uncured thermosetting resin or applying thermosetting resin powder to reinforced fibers or cloth thereof and then melting the resin powder under a pressure so as to impregnate the fiber structure with the resin. However, prepregs manufactured in these methods cannot be easily handled. For example, such prepregs are adhesive and are hard to work into complicated shapes.

Reinforced fibers include inorganic fibers such as glass fibers and carbon fibers and organic fibers such as aramid fibers. Furthermore, reinforced fibers are broadly divided into continuous fibers and discontinuous fibers depending upon the usage patterns. Continuous fibers are at least several meters in length. Molded components made of fiber reinforced composite materials containing continuous fibers as reinforced fibers are manufactured by, for example, a hand lay-up method or an autoclave method. In the hand lay-up method, continuous fibers processed on woven clothes such as textile fabrics and knitted fabrics are coated with an uncured thermosetting resin with a brush or a roller, and then the thermosetting resin is cured to manufacture molded components. In the autoclave method, a required number of prepregs impregnated with an uncured thermosetting resin are stacked on continuous fibers and then are heated and pressed by an autoclave to manufacture molded components. Discontinuous fibers are obtained by cutting continuous fibers to several millimeters to several centimeters and are called chopped fibers or cut fibers. For example, in the hand lay-up method, molded components made of fiber reinforced composite materials containing discontinuous fibers as reinforced fibers are manufactured by regularly or irregularly orientating discontinuous fibers in a mold and then applying an uncured thermosetting resin with a brush or a roller before curing of the thermosetting resin. Alternatively, molded components are manufactured by heating and pressing, in a mold, a sheet molding compound (SMC) material prepared by mixing an uncured thermosetting resin and discontinuous fibers beforehand or a bulk molding compound (BMC) material prepared by mixing an uncured thermosetting resin and discontinuous fibers beforehand.

In the method of manufacturing molded components made of an SMC material or a BMC material with discontinuous fibers used as reinforced fibers, reinforced fibers are impregnated with a resin beforehand and thus the steps are simplified (the step of injecting a resin is eliminated) with high productivity. Furthermore, the short reinforced fibers facilitate the passage of the material so as to manufacture molded components in complicated shapes. These characteristics allow this method to be widely used for manufacturing construction materials such as a bath tub and automobile parts such as a spoiler.

An SMC material is particularly a sheet material having a thickness of several millimeters. Reinforced fibers including glass or carbon fibers cut to 10 mm to 50 mm are dispersed at random or in one direction on an uncured thermosetting resin sheet made of materials such as polyester resin and vinyl ester resin. In the method of manufacturing molded components made of an SMC material (SMC method), the SMC material disposed in a mold is heated and pressed to have a larger size. This passes the material into a final shape and cures the material by heat, thereby manufacturing a molded component. The SMC method is similar to metal press molding and thus has been widely used for manufacturing automobile parts such as a hood and a door panel.

In addition to prepregs obtained by impregnating continuous fibers with an uncured thermosetting resin, a known material containing continuous fibers as reinforced fibers is obtained by stacking a thermoplastic resin sheet and textile fabrics (woven clothes) including thermoplastic resin fibers and reinforced fibers or a mixed yarn thereof, and heating and pressing the sheet at a specific temperature (For example, see Japanese Patent Laid-Open No. 63-87228).

The use of a thermoplastic resin as a matrix resin leads to various choices of a matrix resin and allows the use of a high-performance resin called an engineering plastic. This may widen the application of a fiber reinforced composite material. Moreover, the use of a thermoplastic resin considerably shortens a molding cycle as compared with the use of a thermosetting resin and thus is expected to be applied to a fiber reinforced composite material for mass-produced items of automobiles.

Carbon fiber reinforced thermoplastics (CFRTP) containing carbon fibers as reinforced fibers and thermoplastic resins of nylon, polycarbonate (PC), and so on as matrix resins can be flexibly molded into complicated shapes by injection molding. In other words, CFRTP has high moldability. Thus, CFRTP has been recently used for components of electric or electronic equipment such as a personal computer, OA equipment, a digital camera, a digital video camera, a cellular phone, audiovisual equipment, a telephone, a facsimile, an electrical appliance, and a toy, or cabinets that accommodate these components and dense packaging circuits (For example, see Japanese Patent Laid-Open No. 2004-358828).

However, a main unit serving as the cabinet of electric or electronic equipment requires a thick portion called a boss or a rib that is integrated with the main unit so as to connect a component of the electric or electronic equipment and the main unit. It has been quite difficult to form a fiber reinforced composite material containing continuous fibers as reinforced fibers into a thick portion such as a boss or a rib. For this reason, a boss or a rib additionally molded onto the top surface of the cabinet with an adhesive or the like contains a thermoplastic resin as a matrix resin and is made of a fiber reinforced composite material containing discontinuous fibers as reinforced fibers (For example, see Japanese Patent Laid-Open No. 2004-358828).

As has been discussed, if the cabinets of electric or electronic equipment such as a personal computer, OA equipment, a digital camera, a digital video camera, a cellular phone, AV equipment, a home appliance, and a toy are made of a fiber reinforced composite material, the fiber reinforced composite material needs to be molded into a fine and complicated shape called a boss or a rib. However, it has been quite difficult to form a fiber reinforced composite material containing continuous fibers, which have more excellent mechanical characteristics than discontinuous fibers, as reinforced fibers into a boss or a rib. Thus, a boss or a rib made of a fiber reinforced composite material containing discontinuous fibers as reinforced fibers is additionally molded onto the top surface of a cabinet with an adhesive or the like. Unfortunately, the boss or the rib molded onto the top surface with an adhesive or the like is likely to be broken from the top surface at the basal portion of the boss or the rib by a concentrated stress. Prioritizing moldability, a thermoplastic fiber reinforced composite material containing discontinuous fibers as reinforced fibers may be molded into a cabinet including a boss or a rib. A fiber reinforced composite material containing discontinuous fibers as reinforced fibers has less excellent mechanical characteristics such as a tensile strength than a fiber reinforced composite material containing continuous fibers as reinforced fibers. Thus, also in this case, the boss or the rib is likely to be broken from the top surface at the basal portion of the boss or the rib by a concentrated stress.

The present invention has been devised to solve the conventional problem. An object of the present invention is to provide a molding method for a fiber reinforced composite material and a molding apparatus for the fiber reinforced composite material, by which a thick portion such as a boss or a rib with a fine and complicated shape can be integrally formed with a molded component concurrently with the main unit of the molded component.

DISCLOSURE OF THE INVENTION

In a molding method for a fiber reinforced composite material according to the present invention, the fiber reinforced composite material containing reinforced fibers and a thermoplastic matrix resin disposed in a mold including a first mold and a second mold that form a cavity, the fiber reinforced composite material being heated and pressed in the mold and then cooled so as to obtain a molded component, the molding method includes: a heating step of heating, in a process of closing the first mold and the second mold, the fiber reinforced composite material, in a state in which one of the cavity forming surface of the first mold and the cavity forming surface of the second mold with a recessed portion for molding a thick portion such as a boss or a rib is brought into contact with the fiber reinforced composite material, and the cavity forming surface including the recessed portion is set at a higher temperature than the other cavity forming surface not including the recessed portion; a pressing step of pressing the fiber reinforced composite material in the closed first mold and second mold so as to pass the fiber reinforced composite material in the cavity of the molds and the recessed portion; and a cooling step of cooling the fiber reinforced composite material by cooling the cavity forming surface of the first mold and the cavity forming surface of the second mold, the first mold and the second mold being opened to obtain the molded component.

A molding method for a fiber reinforced composite material according to the present invention is a molding method for a fiber reinforced composite material containing reinforced fibers and a thermoplastic matrix resin disposed in a mold including a first mold and a second mold that form a cavity, the fiber reinforced composite material being heated and pressed in the mold and then cooled so as to obtain a molded component, the molding method including: a heating step of heating, in a process of closing the first mold and the second mold, the fiber reinforced composite material, in a state in which the cavity forming surface of the first mold and the cavity forming surface of the second mold with a recessed portion for molding a thick portion such as a boss or a rib is brought into contact with the fiber reinforced composite material, and the cavity forming surface of the recessed portion having a larger volume is heated to a higher temperature than the other cavity forming surface, a pressing step of pressing the fiber reinforced composite material in the closed first mold and second mold so as to pass the fiber reinforced composite material in the cavity of the molds and the recessed portion; and a cooling step of cooling the fiber reinforced composite material by cooling the cavity forming surface of the first mold and the cavity forming surface of the second mold, the first mold and the second mold being opened to obtain the molded component.

A molded component of a fiber reinforced composite material according to the present invention, the molded component including a main body and a thick portion such as a boss or a rib that are integrally molded with the main body by the fiber reinforced composite material containing reinforced fibers and a matrix resin, wherein the matrix resin is a thermoplastic resin, the reinforced fibers are continuous fibers, and a boundary surface between the main body and the thick portion is connected by the reinforced fibers.

A molding apparatus for a fiber reinforced composite material according to the present invention, the molding apparatus obtaining a molded component by applying heat and a pressure to the fiber reinforced composite material containing reinforced fibers and a matrix resin disposed in a mold, and then cooling the fiber reinforced composite material, the molding apparatus including: a first mold having a cavity forming surface; a second mold having a cavity forming surface that forms a cavity with the cavity forming surface of the first mold; a heating circuit that heats one of the cavity forming surface of the first mold and the cavity forming surface of the second mold to a higher temperature with a recessed portion for molding a thick portion such as a boss or a rib than the other cavity forming surface not including the recessed portion for molding the thick portion; a mold closing mechanism that starts closing the first mold and the second mold, temporarily stops closing the molds when the fiber reinforced composite material is in contact with one of the cavity forming surface of the first mold and the cavity forming surface of the second mold with the recessed portion during the closing of the molds, holds the first mold and the second mold for a predetermined period at a position where the closing is stopped, and then closes the first mold and the second mold with a pressure to the fiber reinforced composite material so as to pass the fiber reinforced composite material in the cavity of the molds and the recessed portion; a cooling circuit that cools the fiber reinforced composite material by cooling the cavity forming surface of the first mold and the cavity forming surface of the second mold after the molds are closed; and a mold opening mechanism that opens the first mold and the second mold after the cooling of the cooling circuit.

A molding apparatus for a fiber reinforced composite material according to the present invention, the molding apparatus obtaining a molded component by applying heat and a pressure to the fiber reinforced composite material containing reinforced fibers and a thermoplastic matrix resin disposed in a mold including a first mold and a second mold that form a cavity, and then cooling the fiber reinforced composite material, the molding apparatus including: the first mold with a cavity forming surface having a recessed portion for molding a thick portion such as a boss or a rib; the second mold with a cavity forming surface that has the recessed portion for molding the thick portion such as a boss or a rib and forms the cavity with the cavity forming surface of the first mold; a heating circuit that heats one cavity forming surface of the recessed portion having a larger volume of the cavity forming surface of the first mold and the cavity forming surface of the second mold to a higher temperature than the other cavity forming surface; a mold closing mechanism that starts closing the first mold and the second mold, temporarily stops closing the molds when the fiber reinforced composite material is in contact with the cavity forming surface of the first mold and the cavity forming surface of the second mold during the closing of the molds, holds the first mold and the second mold for a predetermined period at a position where the closing is stopped, and then closes the first mold and the second mold with a pressure to the fiber reinforced composite material so as to pass the fiber reinforced composite material in the cavity of the molds and the recessed portion; a cooling circuit that cools the fiber reinforced composite material by cooling the cavity forming surface of the first mold and the cavity forming surface of the second mold after the molds are closed; and a mold opening mechanism that opens the first mold and the second mold after the cooling of the cooling circuit.

According to the present invention, a thermoplastic fiber reinforced composite material containing continuous fibers as reinforced fibers is molded so as to integrally form a fine and complicated shape such as a boss or a rib with a molded component concurrently with the main body of the molded component.

DESCRIPTION OF THE EMBODIMENTS

Figure 1:
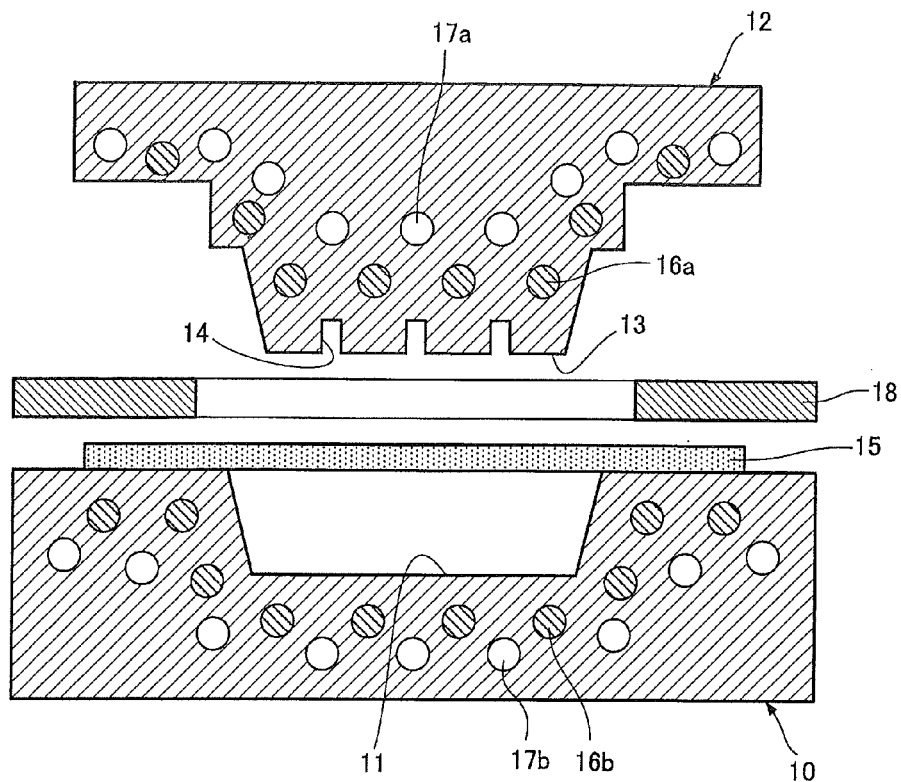
FIG. 1 is a cross-sectional view showing the principal part of a structural example of a molding apparatus for a fiber reinforced composite material according to a first embodiment of the present invention.

Embodiments of the present invention will be described below with reference to the accompanying drawings. The same constituent elements are indicated by the same reference numerals and the explanation thereof may be omitted. For the sake of understanding, the schematic drawings mainly illustrate the constituent elements. Furthermore, the illustrated constituent elements are different in thickness and length from actual constituent elements for the preparation of the drawings. The shapes and dimensions of the constituent elements in the following embodiments are merely exemplary and are not particularly limited. The embodiments may be changed in various ways without substantially departing from the effect of the present invention. Moreover, matters described in the following embodiments may be optionally combined.

First Embodiment

FIG. 1 is a cross-sectional view showing the principal part of a structural example of a molding apparatus for a fiber reinforced composite material according to a first embodiment. The molding apparatus is provided with molds, each having a cavity forming surface.

A thermoplastic fiber reinforced composite material containing reinforced fibers of continuous fibers and a matrix resin of a thermoplastic resin is heated and pressed in the mold and then is cooled to obtain a molded component made of the fiber reinforced composite material. The molding apparatus for the fiber reinforced composite material according to the first embodiment will be specifically described below.

As shown in FIG. 1, the mold of the molding apparatus includes a first mold 10 on the stationary side and a second mold 12 on the movable side. The first mold 10 has a concave cavity forming surface 11 while the second mold 12 has a convex cavity forming surface 13. The convex cavity forming surface 13 forms a cavity for the molding of a molded component with the concave cavity forming surface 11. The convex cavity forming surface 13 has recessed portions 14 for molding a boss or a rib.

For heating or cooling of a thermoplastic fiber reinforced composite material 15 in the molds, heating circuits 16a and 16b, e.g., electric heaters are respectively disposed nearest the convex cavity forming surface 13 of the second mold 12 and the concave cavity forming surface 11 of the first mold 10. Furthermore, cooling circuits 17a and 17b are disposed outside the heating circuits 16a and 16b, respectively. Reversely from the layout of FIG. 1, the cooling circuits 17a and 17b may be disposed between the heating circuits 16a and 16b and the cavity forming surfaces 13 and 11.

Figure 2:
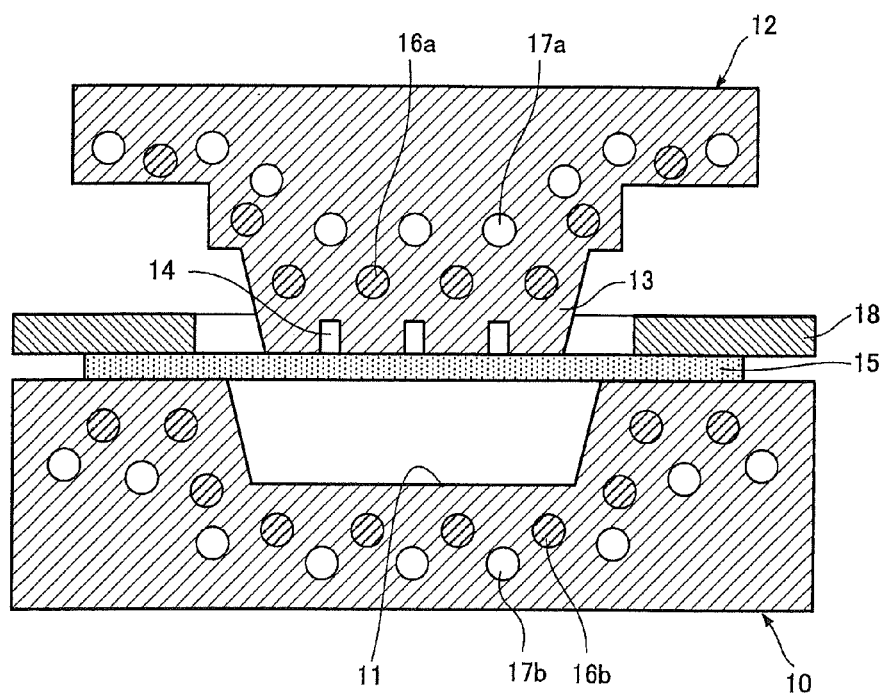
FIG. 2 is a cross-sectional view showing the process of closing the molds of the molding apparatus for the fiber reinforced composite material according to the first embodiment of the present invention.

FIG. 2 is a cross-sectional view showing the process of closing the molds of the molding apparatus for the fiber reinforced composite material according to the first embodiment. As shown in FIG. 2, a workpiece pressing plate 18 disposed near the first mold 10 moves to the first mold 10 so as to hold the fiber reinforced composite material 15 around the concave cavity forming surface 11 between the workpiece pressing plate 18 and the first mold 10, thereby clamping the fiber reinforced composite material 15. The workpiece pressing plate 18 may be omitted.

After the workpiece pressing plate 18 clamps the fiber reinforced composite material 15, the second mold 12 is moved to the first mold 10 by a mold closing mechanism (not shown) such that the convex cavity forming surface 13 comes into contact with the fiber reinforced composite material 15. The second mold 12 is then held at that position for a predetermined period. At this point, the heating circuit 16a heats the convex cavity forming surface 13 to a temperature that is equal to or higher than the melting temperature of a matrix resin contained in the fiber reinforced composite material 15 and is lower than the melting temperature of reinforced fibers contained in the fiber reinforced composite material 15. Thus, on the convex cavity forming surface 13 having the recessed portions 14 for molding a boss or a rib, the surface temperature of the fiber reinforced composite material 15 reaches at least the melting temperature of the matrix resin contained in the fiber reinforced composite material 15, increasing the flowability of the fiber reinforced composite material 15 on the convex cavity forming surface 13.

Figure 3:
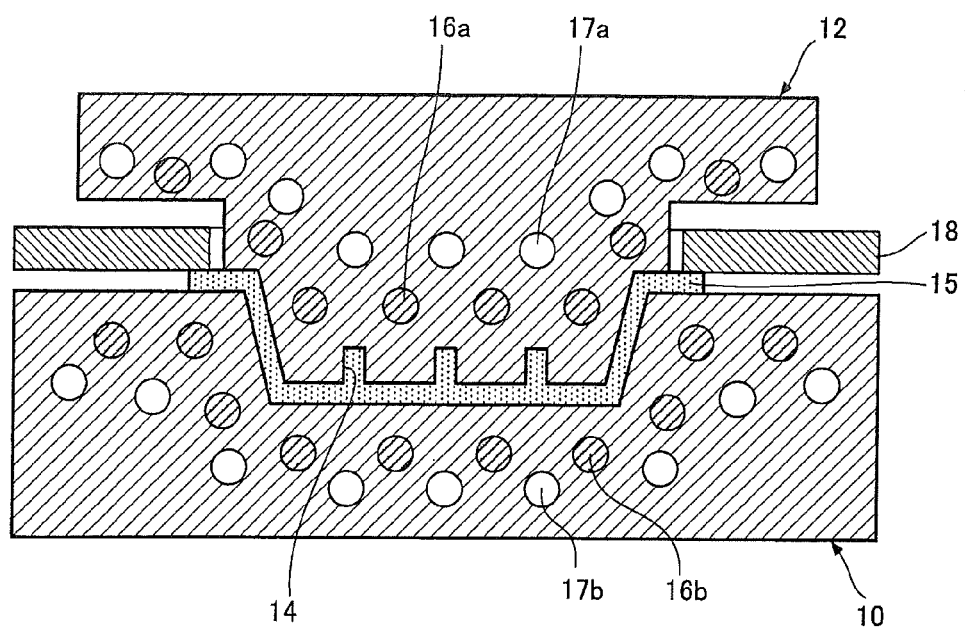
FIG. 3 is a cross-sectional view when the molds are closed in the molding apparatus for the fiber reinforced composite material according to the first embodiment of the present invention.

FIG. 3 is a cross-sectional view when the molds are closed in the molding apparatus for the fiber reinforced composite material according to the first embodiment. The first mold 10 and the second mold 12 are held for the predetermined period when being closed, and then the molds are closed by the mold closing mechanism (not shown). At this point, the fiber reinforced composite material 15 is heated to a temperature that is equal to or higher than the melting temperature of the thermoplastic matrix resin contained in the fiber reinforced composite material 15 and is lower than the melting temperature of reinforced fibers contained in the fiber reinforced composite material 15. The application of a mold clamping force to the fiber reinforced composite material 15 passes the matrix resin through the cavity of the molds. The passage of the matrix resin causes reinforced fibers to flow in the cavity of the molds. At this point, the heating circuit 16b disposed in the first mold 10 is set at a temperature that is equal to or higher than the melting temperature of the matrix resin contained in the fiber reinforced composite material 15 and is lower than the temperature of the heating circuit 16a disposed in the second mold 12. Thus, the matrix resin of the fiber reinforced composite material 15 melts to a higher degree on the cavity forming surface 13 than on the cavity forming surface 11. In other words, the viscosity of the matrix resin of the fiber reinforced composite material 15 is lower on the cavity forming surface 13 than on the cavity forming surface 11. This accelerates the passage of the matrix resin and reinforced fibers to the cavity forming surface 13, allowing the matrix resin and reinforced fibers to flow into the fine and complicated gaps of the recessed portions 14 for molding a boss or a rib. Thus, the moldability of a boss or a rib improves.

When the molds are closed, the matrix resin is melted in the fiber reinforced composite material 15 with reinforced fibers floating in the molten matrix resin. The matrix resin is first pressed to flow into the spaces of the recessed portions 14 for molding a boss or a rib. Reinforced fibers also flow into the spaces of the recessed portions 14 in response to the flow of the matrix resin.

After that, the cooling circuits 17a and 17b disposed in the second mold 12 and the first mold 10 cool the convex cavity forming surface 13 of the second mold 12 and the concave cavity forming surface 11 of the first mold 10, thereby solidifying the matrix resin contained in the fiber reinforced composite material 15.

Figure 4:
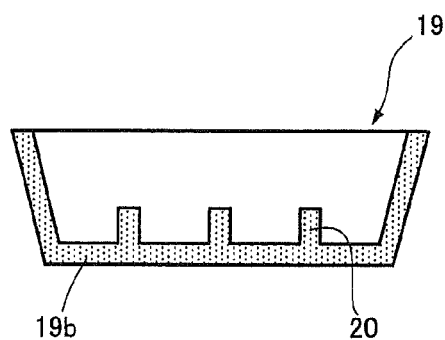
FIG. 4 is a cross-sectional view showing an example of a molded component removed from the molding apparatus for the fiber reinforced composite material according to the first embodiment of the present invention.

Subsequently, the second mold 12 is separated from the first mold 10 by a mold opening mechanism (not shown) so as to open the first mold 10 and the second mold 12. After the molds are opened, a molded component having a temperature equal to or lower than the solidification temperature of the matrix resin is removed from the molds. FIG. 4 is a cross-sectional view showing a molded component 19 removed from the molding apparatus for the fiber reinforced composite material according to the first embodiment. Thick portions 20 are integrally molded with a main body 19b of the molded component 19.

With this configuration, the fiber reinforced composite material 15 is heated in the molds to melt the matrix resin contained in the fiber reinforced composite material 15; meanwhile, the fiber reinforced composite material 15 is compressed to pass the matrix resin in the cavity of the molds. Reinforced fibers contained in the fiber reinforced composite material 15 are caused to pass through the cavity of the molds by using the flow of the matrix resin. Thus, the fiber reinforced composite material 15 containing continuous fibers as reinforced fibers can be formed into a fine and complicated shape such as a boss or a rib, achieving the molded component 19 having continuous fibers in a boss or a rib.

The recessed portions 14 for molding a boss or a rib may be formed on the concave cavity forming surface 11 of the first mold 10. In this case, the heating circuit 16b heats the concave cavity forming surface 11 to a temperature that is equal to or higher than the melting temperature of the matrix resin contained in the fiber reinforced composite material 15 and is lower than the melting temperature of reinforced fibers contained in the fiber reinforced composite material 15; meanwhile, the heating circuit 16a heats the convex cavity forming surface 13 of the second mold 12 to a temperature that is equal to or higher than the melting temperature of the matrix resin contained in the fiber reinforced composite material 15 and is lower than the temperature of concave cavity forming surface 11 of the first mold 10. In the process of closing the first mold 10 and the second mold 12, when the concave cavity forming surface 11 of the first mold 10 comes into contact with the fiber reinforced composite material 15, the closing of the molds is temporarily stopped to hold the first mold 10 and the second mold 12 at that position for a predetermined period. The molds are closed by the mold closing mechanism (not shown).

The recessed portions 14 for molding a boss or a rib may be formed on both of the concave cavity forming surface 11 of the first mold 10 and the convex cavity forming surface 13 of the second mold 12. In this case, the heating circuits 16a and 16b heat the convex cavity forming surface 13 and the concave cavity forming surface 11 to a temperature that is equal to or higher than the melting temperature of the matrix resin contained in the fiber reinforced composite material 15 and is lower than the melting temperature of reinforced fibers contained in the fiber reinforced composite material 15. Moreover, on one of the cavity forming surfaces 11 and 13, the total volume of the spaces of the recessed portions 14 is increased and the temperature is set higher than that of the other cavity forming surface by the heating circuits 16a and 16b. In the process of closing the first mold 10 and the second mold 12, when the concave cavity forming surface 11 of the first mold 10 and the convex cavity forming surface 13 of the second mold 12 come into contact with the fiber reinforced composite material 15, the closing of the molds is temporarily stopped to hold the first mold 10 and the second mold 12 at a position where the closing is stopped for a predetermined period. The molds are closed by the mold closing mechanism (not shown).

The concave cavity forming surface 11 may be formed on the second mold 12 while the convex cavity forming surface 13 may be formed on the first mold 10.

Figure 5:
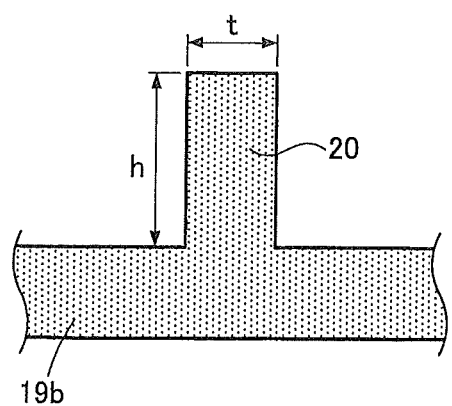
FIG. 5 is a cross-sectional view showing an example of a boss or a rib of the molded component according to the first embodiment of the present invention.
Figure 6:
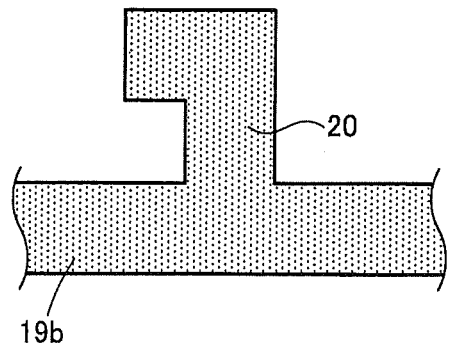
FIG. 6 is a cross-sectional view showing another example of the boss or the rib of the molded component according to the first embodiment of the present invention.

FIG. 5 is a cross-sectional view showing an example of the boss or rib of the molded component according to the first embodiment. As shown in FIG. 5, for example, the thick portion 20 of the boss or rib having a diameter or width t of about 1 mm and a height h of about 10 mm protrudes from a flat portion. These specific dimensions are merely exemplary. The thick portion 20 is moldable as long as h/t is about 10. As shown in FIG. 6, the thick portion 20 may have an undercut shape. The thick portion 20 having an undercut shape can be molded by a mold having a slide core.

Figure 7:
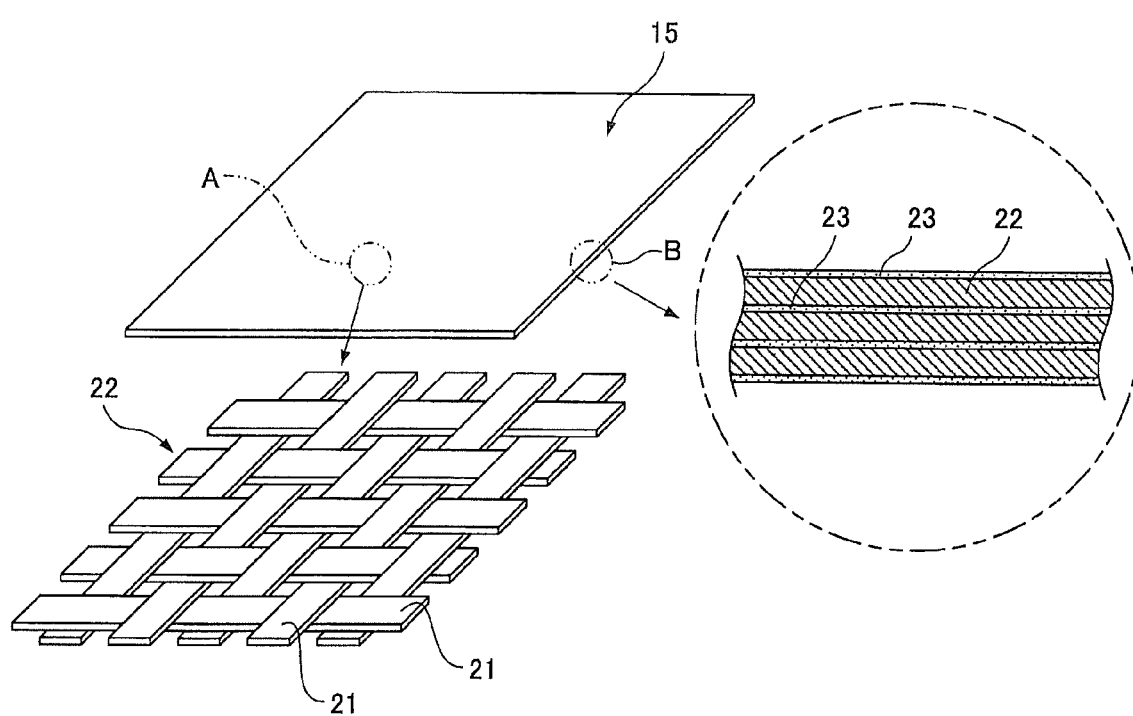
FIG. 7 is a schematic diagram showing a structural example of the fiber reinforced composite material according to the first embodiment of the present invention.

FIG. 7 is a schematic diagram showing a structural example of the fiber reinforced composite material 15 containing continuous fibers as reinforced fibers. The fiber reinforced composite material 15 containing continuous fibers as reinforced fibers may be configured such that layers of textile fabric 22 are stacked as shown in an enlarged view of a part B, the textile fabric 22 including fiber bundles 21 in rows and columns as shown in an enlarged view of a part A, the fiber bundle 21 including several thousands of continuous fibers surrounded by the matrix resin of a thermoplastic resin. As shown in the enlarged view of the part B, a matrix resin 23 fills gaps between the layers of textile fabric 22 in a microscopic state. The number of layers of textile fabric 22 varies depending upon a desired thickness and so on. The fiber bundles 21 may be arranged in one direction.

Figure 8:
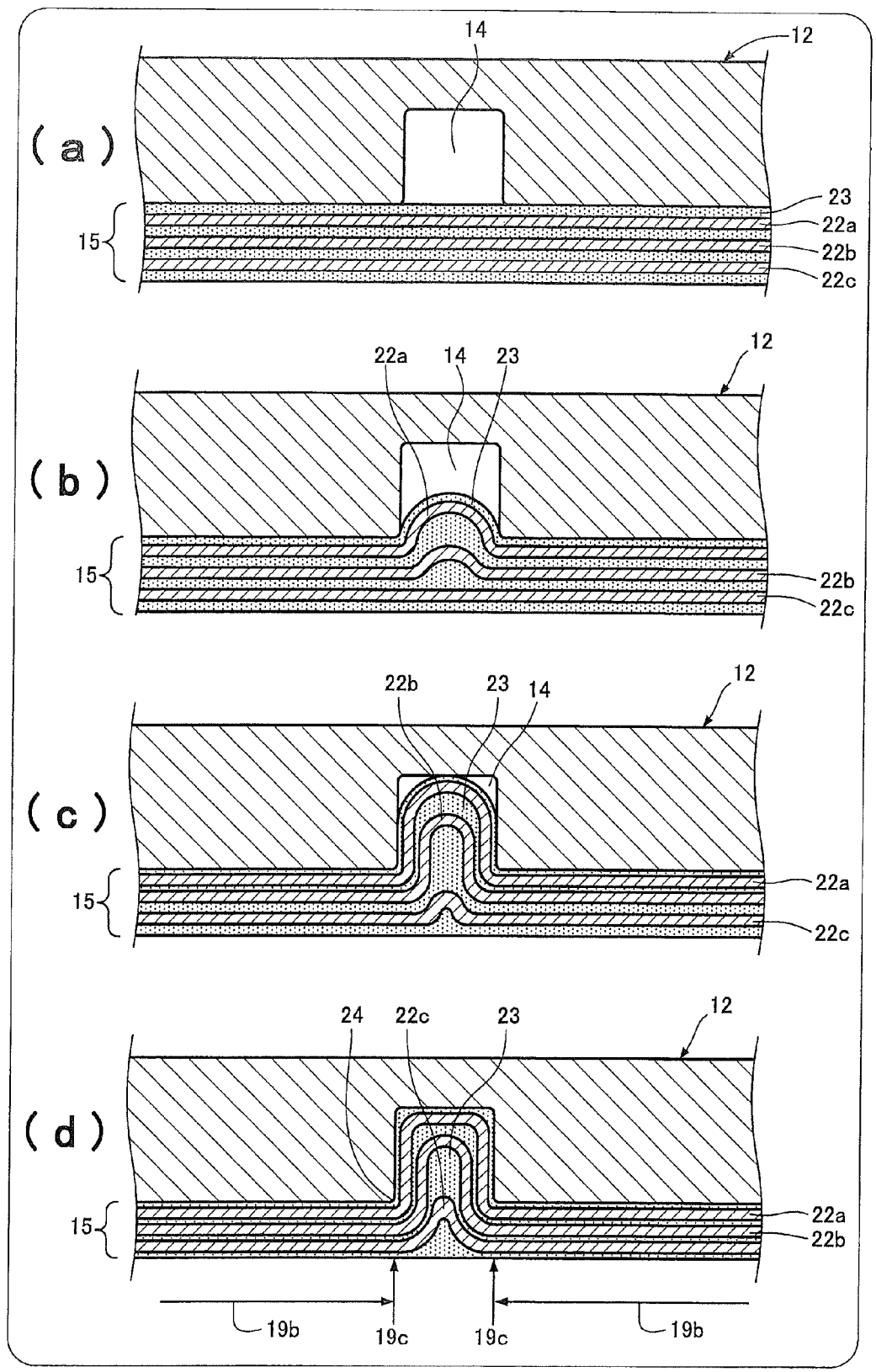
FIG. 8 is a cross-sectional view for explaining a molding process for the boss or the rib of the molded component according to the first embodiment of the present invention.

FIGS. 8(a) to 8(d) are cross-sectional views for explaining the molding process of a boss or a rib according to the first embodiment. FIGS. 8(a) to 8(d) do not illustrate the heating circuits 16a and 16b and the cooling circuits 17a and 17b. As has been discussed, when the fiber reinforced composite material 15 is pressed, the surface of the fiber reinforced composite material 15 melts to a higher degree on the second mold 12 than on the first mold 10, increasing the flowability of the fiber reinforced composite material 15 on the convex cavity forming surface of the second mold 12. This accelerates the passage of the matrix resin 23 and the textile fabric 22 into the recessed portions 14 for molding a boss or a rib. As shown in FIGS. 8(b) to 8(d), the application of a mold clamping force to the fiber reinforced composite material 15 passes the matrix resin 23 into the recessed portions 14. The passage of the matrix resin 23 causes the textile fabric 22 to flow into the space of the recessed portion 14.

Consequently, as shown in FIG. 8(d), the stacked layers of the textile fabric 22 containing continuous fibers are distributed along the cross-sectional shape of the thick portion 20, allowing the continuous fibers to spread over the cross-sectional shape of the thick portion 20. The layers of the textile fabric 22 at a basal portion 24 of the thick portion 20 are more densely distributed near the outer surface of the thick portion 20 than on other portions. This increases the stiffness of the thick portion 20.

As shown in FIGS. 8(b) to 8(d), continuous fibers at the basal portion 24 of the thick portion 20 are more densely distributed than in the original distribution of textile fabric layers 22a to 22c because the textile fabric layers 22a to 22c drawn by the matrix resin 23 flowing into the recessed portion 14 sequentially flow into the space of the recessed portion 14 and gather at the basal portion 24 of the thick portion 20, starting from the textile fabric 22a disposed near the recessed portion 14. Less of the textile fabric 22c separated from the recessed portion 14 flows into the space of the recessed portion 14 than does the textile fabric 22a.

In the case of textile fabrics, fiber bundles of continuous fibers are disposed in two directions orthogonal to each other. Thus, continuous fibers in the thick portion 20 are disposed in two directions orthogonal to each other and are three-dimensionally distributed as fiber bundles in the thick portion.

With this configuration, also in the molded component 19 made of the fiber reinforced composite material 15 containing continuous fibers as reinforced fibers, continuous fibers are distributed over the cross-sectional shape of the thick portion 20. Moreover, continuous fibers at the basal portion 24 of the thick portion 20 are more densely distributed near the outer surface of the thick portion 20 than on other portions. This increases the stiffness of the thick portion 20. If thick portions such as a boss or a rib are formed by, for example, injection molding in addition to a cabinet made of a fiber reinforced composite material as described in Japanese Patent Laid-Open No. 2004-358828, the strength of a boundary surface between the thick portion 20 and the main body 19b serving as a cabinet depends upon the strength of a resin. In the first embodiment, a boundary surface 19c between the thick portion 20 such as a boss or a rib and the main body 19b of the molded component 19 is connected by continuous fibers of reinforced fibers, thereby sufficiently using the mechanical characteristics of the fiber reinforced composite material 15.

Figure 9:
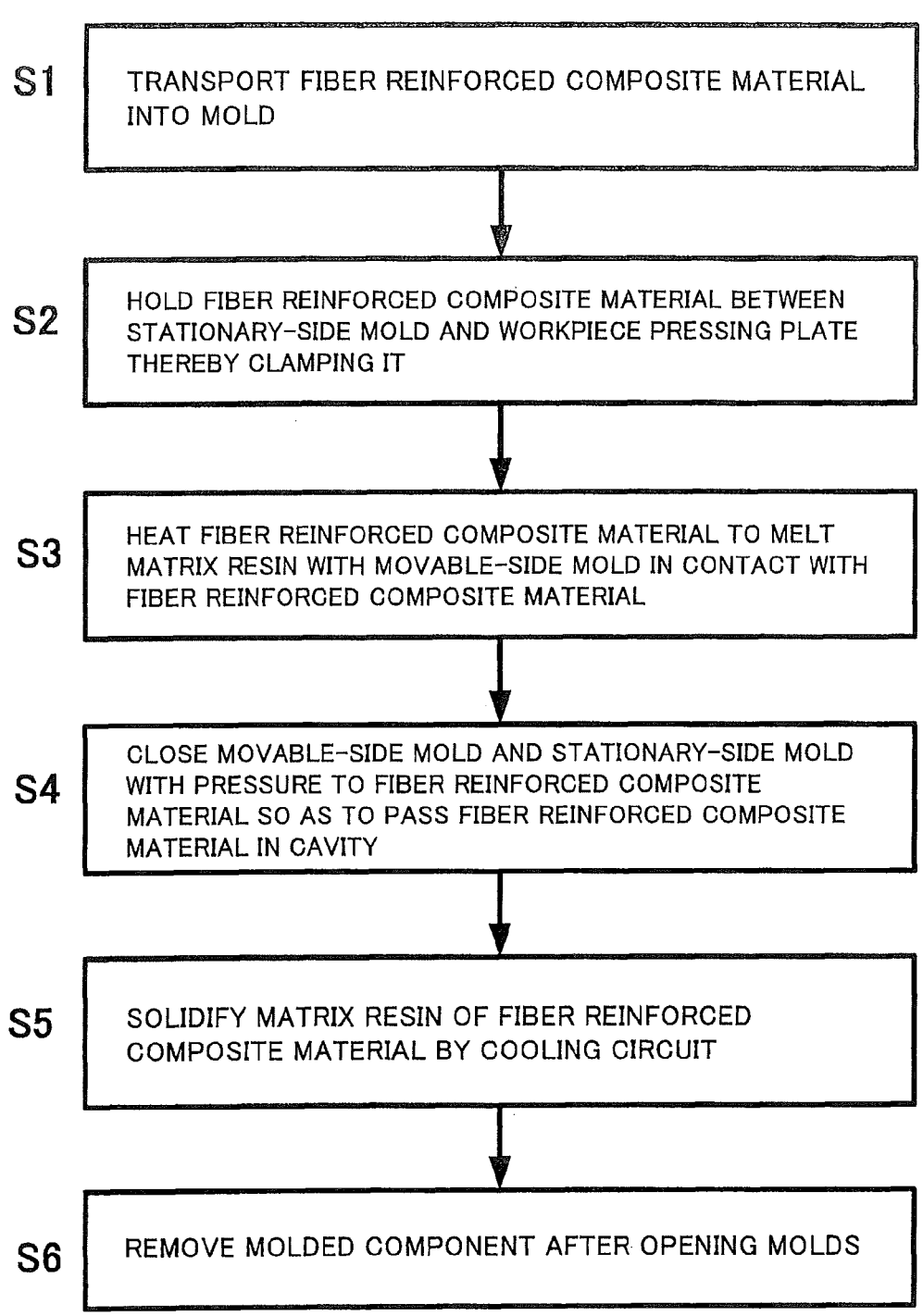
FIG. 9 is a flowchart showing an example of a molding method for the fiber reinforced composite material according to the first embodiment of the present invention.

A molding method for the fiber reinforced composite material will be described below, the molding method using the molding apparatus for the fiber reinforced composite material. In the molding method, the fiber reinforced composite material containing continuous fibers of reinforced fibers and a thermoplastic resin of a matrix resin is disposed in the molds having the cavity forming surfaces. The fiber reinforced composite material is heated and pressed in the molds and then is cooled to obtain the molded component made of the fiber reinforced composite material. Referring to FIG. 9, the molding method for the fiber reinforced composite material according to the first embodiment will be specifically described below. FIG. 9 is a flowchart showing an example of the molding method according to the first embodiment.

First, in step S1, the fiber reinforced composite material 15 is carried into the molds. At this point, the fiber reinforced composite material 15 is carried between the first mold 10 and the workpiece pressing plate 18. The fiber reinforced composite material 15 may be carried into the molds while being clamped by, for example, a robot arm.

In step S2, the ring-shaped workpiece pressing plate 18 is moved to hold the fiber reinforced composite material 15 with the first mold 10, thereby clamping the fiber reinforced composite material 15.

In step S3, the closing of the molds is started to move the second mold 12 to a position where the convex cavity forming surface 13 of the second mold 12 comes into contact with the fiber reinforced composite material 15, and then the second mold 12 is temporarily held at this position. The fiber reinforced composite material 15 is heated to a temperature that is equal to or higher than the melting temperature of the matrix resin contained in the fiber reinforced composite material 15 and is lower than the melting temperature of reinforced fibers contained in the fiber reinforced composite material 15. At this point, the convex cavity forming surface 13 of the second mold 12 is set at a temperature that is equal to or higher than the melting temperature of the matrix resin contained in the fiber reinforced composite material 15 and is lower than the melting temperature of reinforced fibers contained in the fiber reinforced composite material 15. The concave cavity forming surface 11 of the first mold 10 is set at a temperature that is equal to or higher than the melting temperature of the matrix resin contained in the fiber reinforced composite material 15 and is lower than the temperature of the convex cavity forming surface 13 of the second mold 12.

In step S4, the closing of the molds is restarted to close the first mold 10 and the second mold 12, pressing the fiber reinforced composite material 15. This passes the matrix resin to pass through the cavity of the molds. The passage of the matrix resin causes reinforced fibers to flow in the cavity of the molds. Thus, the matrix resin and reinforced fibers flow into the recessed portions 14 for molding the thick portion 20 such as a boss or a rib.

In step S5, the cooling circuits 17a and 17b disposed in the second mold 12 and the first mold 10 cool the convex cavity forming surface 13 of the second mold 12 and the concave cavity forming surface 11 of the first mold 10. This cools the fiber reinforced composite material 15 to solidify the matrix resin.

In step S6, the first mold 10 and the second mold 12 are opened to remove the molded component 19 bonded to the convex cavity forming surface 13 of the second mold 12.

If the recessed portions 14 for molding a boss or a rib are formed on both of the concave cavity forming surface 11 of the first mold 10 and the convex cavity forming surface 13 of the second mold 12, when the cavity forming surface 11 of the first mold 10 and the cavity forming surface 13 of the second mold 12 come into contact with the fiber reinforced composite material 15 in the process of closing the first mold 10 and the second mold 12 in step S3, the closing of the molds may be temporarily stopped to hold the first mold 10 and the second mold 12 for a predetermined period of time and heat the fiber reinforced composite material 15 at a position where the closing is stopped. At this point, one of the cavity forming surface 11 of the first mold 10 and the cavity forming surface 13 of the second mold 12 having the recessed portion 14 with a larger volume is set at a higher temperature than the other cavity forming surface 13 or 11.

Figure 10:
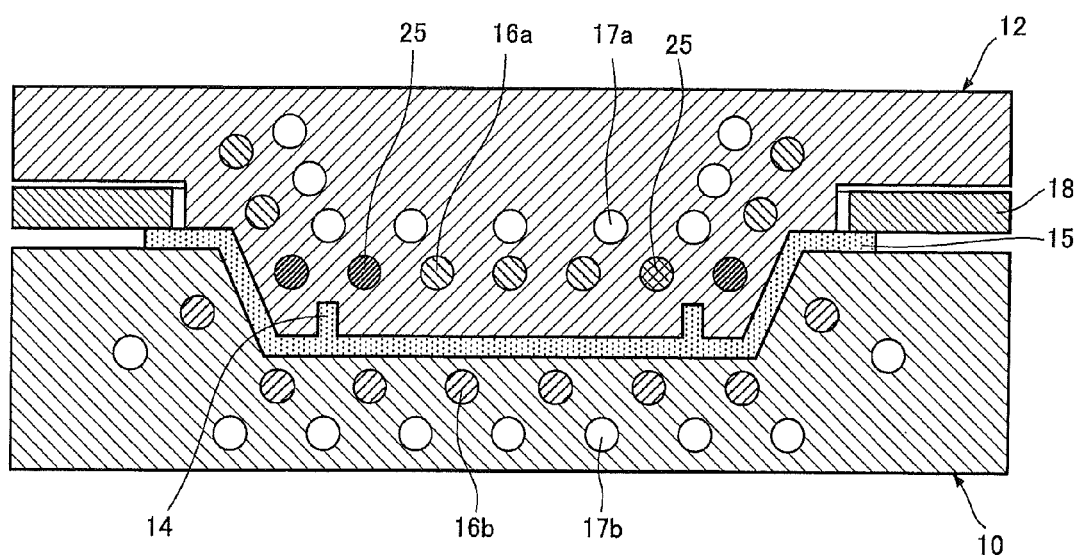
FIG. 10 is a cross-sectional view showing the principal part of a modification of the molding apparatus for the fiber reinforced composite material according to the first embodiment of the present invention.

Referring to FIG. 10, a modification of the first embodiment will be described below. FIG. 10 is a cross-sectional view showing the principal part of the modification of the molding apparatus for the fiber reinforced composite material according to the first embodiment. In the molding apparatus of FIG. 10, a heating circuit 25 is disposed near the recessed portions 14 for molding the thick portion 20 such as a boss or a rib, in addition to the heating circuit 16a. The temperature of the heating circuit 25 is set higher than that of the heating circuit 16a so as to be equal to or higher than the melting temperature of the matrix resin and lower than the melting temperature of reinforced fibers. As has been discussed, the temperature of the heating circuit 16a is set at a temperature that is equal to or higher than the melting temperature of the matrix resin and is lower than the melting temperature of reinforced fibers.

With this configuration, a temperature of the recessed portion 14 for molding a boss or a rib on the convex cavity forming surface 13 of the second mold 12 is higher than those of other portions on the convex cavity forming surface 13, the flowability of the matrix resin increases near the recessed portions 14, and the viscosity of the matrix resin increases with a distance from the recessed portion 14. Thus, when the fiber reinforced composite material 15 is pressed, the matrix resin and reinforced fibers flow to the recessed portions 14 having lower viscosity. This further improves the moldability of a thick portion such as a boss or a rib.

Also in the case where the recessed portions 14 for molding a thick portion such as a boss or a rib are formed on the concave cavity forming surface 11 of the first mold 10, a heating circuit may be disposed near the recessed portions 14 of the first mold 10 in addition to the heating circuit 16b to locally set the recessed portions 14 on the cavity forming surface 11 of the first mold 10 at a temperature higher than the temperatures of other portions on the cavity forming surface 11. As has been discussed, the heating circuits 16a and 16b are set at temperatures that are equal to or higher than the melting temperature of the matrix resin and are lower than the melting temperature of reinforced fibers.

If the recessed portions 14 for molding a boss or a rib are formed on both of the concave cavity forming surface 11 of the first mold 10 and the convex cavity forming surface 13 of the second mold 12, a heating circuit may be disposed near the recessed portions 14 of the second mold 12 in addition to the heating circuit 16a and a heating circuit may be disposed near the recessed portions 14 of the first mold 10 in addition to the heating circuit 16b to locally set the recessed portions 14 on the cavity forming surface 13 of the second mold 12 at a temperature higher than the temperatures of other portions on the cavity forming surface 13 and locally set the recessed portions 14 on the cavity forming surface 11 of the first mold 10 at a temperature higher than the temperatures of other portions on the cavity forming surface 11. As has been discussed, the temperatures of the heating circuits 16a and 16b are both set equal to or higher than the melting temperature of the matrix resin and lower than the melting temperature of reinforced fibers.

Alternatively, the concave cavity forming surface 11 may be formed on the second mold 12 while the convex cavity forming surface 13 may be formed on the first mold 10.

Figure 11:
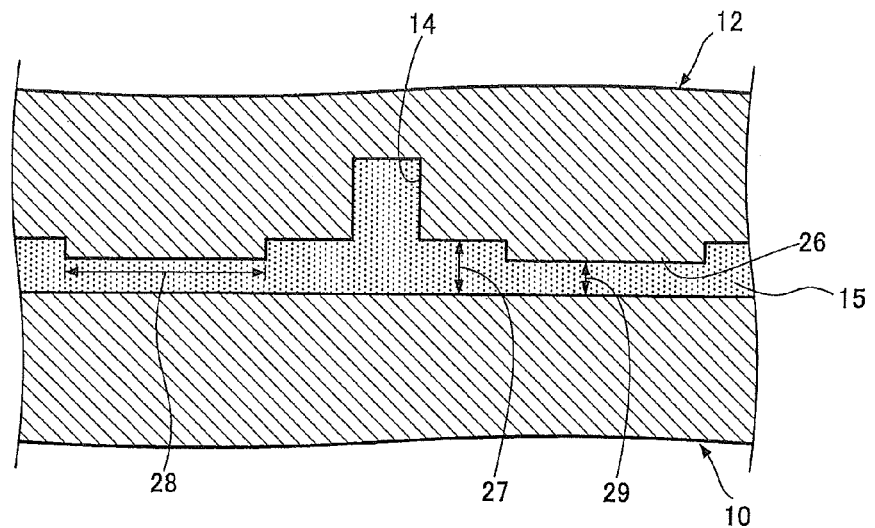
FIG. 11 is an enlarged cross-sectional view for explaining another modification of the molding apparatus for the fiber reinforced composite material according to the first embodiment of the present invention.

Referring to FIG. 11, another modification of the first embodiment will be described below. FIG. 11 is an enlarged cross-sectional view for explaining another modification of the molding apparatus for the fiber reinforced composite material according to the first embodiment. FIG. 11 only illustrates configurations necessary for explaining parts different from those of FIG. 1 or 10. In the molding apparatus of FIG. 11, a protrusion 26 is provided on the cavity forming surface so as to surround the recessed portion 14 for molding a thick portion such as a boss or a rib. The protrusion 26 is located at a distance of about 5 mm to 25 mm from the recessed portion 14. Moreover, the height of the protrusion 26 is set at 0.1 mm to substantially one third of a clearance 27 between the cavity forming surfaces 11 and 13 on two sides of the periphery of the recessed portion 14 while a width 28 of the protrusion 26 is set at about 0.5 mm or larger. In the process of closing the first mold 10 and the second mold 12, when the protrusion 26 comes into contact with the convex cavity forming surface 13 of the second mold 12, the closing of the molds is temporarily stopped to hold the first mold 10 and the second mold 12 for a predetermined period at a position where the closing of the molds is stopped.

With this configuration, when the fiber reinforced composite material 15 is pressed, the protrusion 26 compresses the fiber reinforced composite material 15 prior to the periphery of the recessed portion 14 for molding a thick portion such as a boss or a rib. Thus, the matrix resin and reinforced fibers flow into the recessed portion 14. Subsequently, the fiber reinforced composite material 15 is compressed around the recessed portion 14. At this point, a clearance 29 between the protrusion 26 of the second mold 12 and the cavity forming surface 11 of the first mold 10 is smaller than the clearance 27 between the cavity forming surfaces 11 and 13 on the two sides of the periphery of the recessed portion 14. This hardly allows the matrix resin and reinforced fibers around the recessed portion 14 to flow to the protrusion 26 and increases a flow of the matrix resin and reinforced fibers into the recessed portion 14, thereby improving the moldability of a boss or a rib.

Also in the case where the recessed portions 14 for molding thick portions such as a boss or a rib are formed on the concave cavity forming surface 11 of the first mold 10 or the recessed portions 14 for molding thick portions such as a boss or a rib are formed on both of the concave cavity forming surface 11 of the first mold 10 and the convex cavity forming surface 13 of the second mold 12, the protrusion 26 may be provided on the cavity forming surface so as to surround the recessed portion 14.

The concave cavity forming surface 11 may be formed on the second mold 12 while the convex cavity forming surface 13 may be formed on the first mold 10.

Second Embodiment

Figure 12:
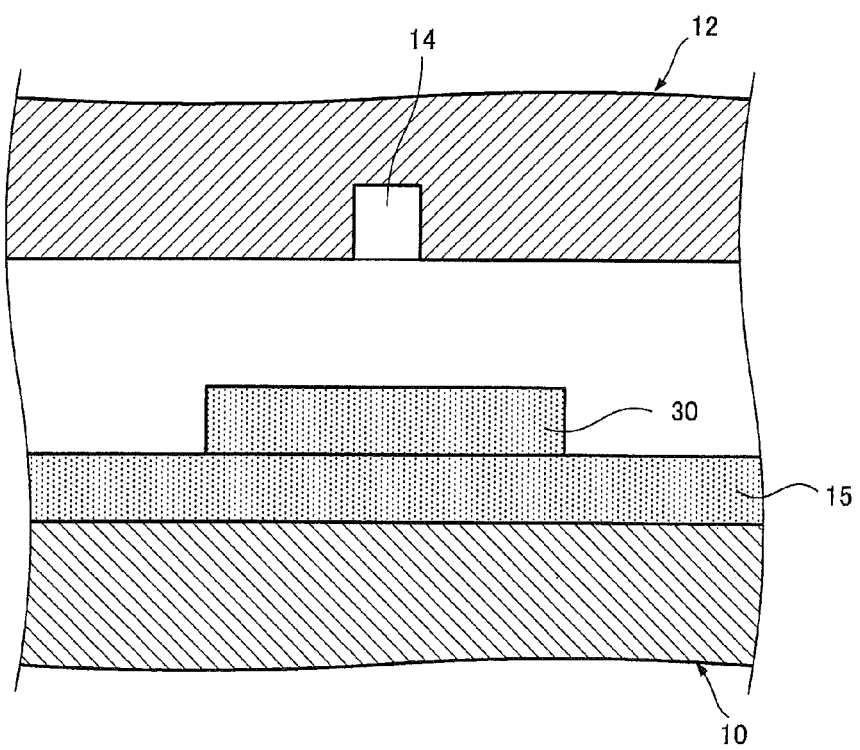
FIG. 12 is an enlarged cross-sectional view for explaining a structural example of a molding apparatus for a fiber reinforced composite material according to a second embodiment of the present invention.

Referring to FIG. 12, matters different from those of the first embodiment will be described below according to a second embodiment of the present invention. FIG. 12 is an enlarged cross-sectional view for explaining a molding apparatus for a fiber reinforced composite material according to the second embodiment. FIG. 12 only shows configurations necessary for explaining different parts from the configurations of the first embodiment. As shown in FIG. 12, in the molding apparatus of the second embodiment, the fiber reinforced composite material is partially stacked so as to be opposed to a recessed portion 14 for molding a thick portion such as a boss or a rib. A second thermoplastic fiber reinforced composite material 30 stacked on a fiber reinforced composite material 15 has a larger volume than the recessed portion 14. In the process of closing a first mold 10 and a second mold 12, when the second thermoplastic fiber reinforced composite material 30 comes into contact with a convex cavity forming surface 13 of the second mold 12, the closing of the molds is temporarily stopped to hold the first mold 10 and the second mold 12 for a predetermined period at a position where the closing of the molds is stopped. Configurations other than the second thermoplastic fiber reinforced composite material 30 and a molding method are similar to those of the first embodiment.

With this configuration, when the fiber reinforced composite material 15 and the second thermoplastic fiber reinforced composite material 30 are pressed, a matrix resin and reinforced fibers easily flow into the recessed portion 14 for molding a boss or a rib, further improving the moldability of a thick portion such as a boss or a rib. The second thermoplastic fiber reinforced composite material 30 stacked on the fiber reinforced composite material 15 is integrated with the fiber reinforced composite material 15, on which the second thermoplastic fiber reinforced composite material 30 is stacked, by heat and a pressure on the boundary surface.

For example, the second thermoplastic fiber reinforced composite material 30 may be temporarily fixed to the fiber reinforced composite material 15 with an adhesive or the like before the fiber reinforced composite material 15 is transported into the molds. For example, one of the fiber reinforced composite material 15 and the second thermoplastic fiber reinforced composite material 30 may be first transported into the molds. Alternatively, the fiber reinforced composite material 15 and the second thermoplastic fiber reinforced composite material 30 may be collectively clamped by, for example, a robot arm and then simultaneously transported into the molds.

If the recessed portion 14 for molding a thick portion such as a boss or a rib is formed on a concave cavity forming surface 11 of the first mold 10 or if the recessed portion 14 for molding a thick portion such as a boss or a rib is formed on each of the concave cavity forming surface 11 of the first mold 10 and the convex cavity forming surface 13 of the second mold 12, the second thermoplastic fiber reinforced composite material 30 may be similarly stacked on a part opposed to the recessed portion 14.

The concave cavity forming surface 11 may be formed on the second mold 12 while the convex cavity forming surface 13 may be formed on the first mold 10.

According to the present invention, a thick portion having a fine and complicated shape such as a boss or a rib can be integrally formed with a molded component concurrently with the main body of the molded component. Thus, the present invention is useful for various molded components requiring a light weight, a small thickness, and high stiffness.

What is claimed is:

1. A molding method for a fiber reinforced composite material containing reinforced fibers and a thermoplastic matrix resin disposed in a mold including a first mold and a second mold that form a cavity, the fiber reinforced composite material being heated and pressed in the mold and then cooled so as to obtain a molded component, the molding method comprising:
   a heating step of heating, in a process of closing the first mold and the second mold, the fiber reinforced composite material, in a state in which one of a cavity forming surface of the first mold and a cavity forming surface of the second mold with a recessed portion for molding a thick portion is brought into contact with the fiber reinforced composite material, and the cavity forming surface including the recessed portion is set at a higher temperature than the other cavity forming surface not including the recessed portion;
   a pressing step of pressing the fiber reinforced composite material in the closed first mold and second mold so as to pass the fiber reinforced composite material in the cavity of the molds and the recessed portion; and
   a cooling step of cooling the fiber reinforced composite material by cooling the cavity forming surface of the first mold and the cavity forming surface of the second mold,
   the first mold and the second mold being opened to obtain the molded component.

2. The molding method for a fiber reinforced composite material according to claim 1, wherein in the heating step, the recessed portion in the cavity forming surface is locally heated to a higher temperature than other portions of the cavity forming surface.

3. The molding method for a fiber reinforced composite material according to claim 1, wherein in the pressing step, the cavity forming surface with the recessed portion includes a protrusion that is formed around the recessed portion on the cavity forming surface such that the fiber reinforced composite material on a part opposed to a portion around the recessed portion is pressed prior to the fiber reinforced composite material on a part opposed to the recessed portion.

4. The molding method for a fiber reinforced composite material according to claim 1, further comprising a thermoplastic second fiber reinforced composite material partially stacked on the thermoplastic fiber reinforced composite material on a part opposed to the recessed portion.

* * * * *